(12) United States Patent
Yao et al.

(10) Patent No.: US 11,219,073 B2
(45) Date of Patent: Jan. 4, 2022

(54) SESSION CONNECTION ESTABLISHMENT METHOD AND CONTROL PLANE NETWORK ELEMENT

(71) Applicant: HUAWEI TECHNOLOGIES CO., LTD., Guangdong (CN)

(72) Inventors: Qi Yao, Shenzhen (CN); Yong Hu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 6 days.

(21) Appl. No.: 16/588,266

(22) Filed: Sep. 30, 2019

(65) Prior Publication Data
US 2020/0029375 A1    Jan. 23, 2020

Related U.S. Application Data

(63) Continuation of application No. PCT/CN2018/081488, filed on Mar. 31, 2018.

(30) Foreign Application Priority Data

Apr. 1, 2017 (CN) .......................... 201710214336.1

(51) Int. Cl.
*H04W 76/12* (2018.01)
*H04W 76/11* (2018.01)

(52) U.S. Cl.
CPC ............ *H04W 76/12* (2018.02); *H04W 76/11* (2018.02)

(58) Field of Classification Search
CPC ....... H04W 4/50; H04W 48/18; H04W 76/11; H04W 76/12
See application file for complete search history.

(56) References Cited

U.S. PATENT DOCUMENTS

| 6,907,244 B2 * | 6/2005 | Santhoff ................... H04L 1/08 |
| | | 455/442 |
| 7,890,119 B2 * | 2/2011 | Jethwa .................. H04W 64/00 |
| | | 455/456.1 |

(Continued)

FOREIGN PATENT DOCUMENTS

| AU | 2016379814 A1 * | 1/2018 | .............. H04W 8/20 |
| AU | 2019202701 A1 * | 5/2019 | .............. H04W 8/20 |

(Continued)

OTHER PUBLICATIONS

3Gpp, 3GPP TR 23.799, Technical Specification Group Services and System Aspects; Study on Architecture for Next Generation System; Mar. 2016, 3GPP, Release 14, Version 0.3.0 (Year: 2016).*

(Continued)

*Primary Examiner* — Eric Nowlin
(74) *Attorney, Agent, or Firm* — Womble Bond Dickinson (US) LLP

(57) ABSTRACT

Embodiments of the application disclose a session connection establishment method and a control plane network element, to select a proper user plane network element from a plurality of distributed user plane network elements for a terminal device that requests a service. In one embodiment, the control plane network element may determine a first user plane network element set from a plurality of distributed user plane network elements based on a service, to select, from the first user plane network element set, a first target user plane network element that supports the service, and establish a session connection of a terminal device. According to the embodiment, a proper user plane network element can be selected from a plurality of distributed user plane network elements for a terminal device that requests a service, thereby improving working efficiency when the (Continued)

control plane network element establishes a session connection of the terminal device.

17 Claims, 5 Drawing Sheets

(56) References Cited

U.S. PATENT DOCUMENTS

| | | | |
|---|---|---|---|
| 9,888,455 B1* | 2/2018 | Laslo-Amit | H04W 4/029 |
| 9,967,801 B2* | 5/2018 | Byun | H04W 60/00 |
| 10,278,123 B2* | 4/2019 | Wang | H04W 48/18 |
| 10,341,911 B2* | 7/2019 | Kim | H04W 76/30 |
| 10,499,276 B2* | 12/2019 | Chan | H04W 28/0289 |
| 10,506,489 B2* | 12/2019 | Vrzic | H04W 36/26 |
| 10,582,551 B2* | 3/2020 | Zhu | H04W 12/08 |
| 10,601,932 B2* | 3/2020 | Kodaypak | H04W 72/00 |
| 10,757,624 B2* | 8/2020 | Jin | H04W 76/11 |
| 10,798,647 B2* | 10/2020 | Wang | H04W 48/10 |
| 10,805,846 B2* | 10/2020 | Youn | H04W 36/0011 |
| 2005/0048978 A1* | 3/2005 | Santhoff | H04B 1/7176 455/442 |
| 2005/0201333 A1* | 9/2005 | Santhoff | H04B 1/1027 370/333 |
| 2005/0226188 A1* | 10/2005 | Santhoff | H04B 1/1027 370/335 |
| 2010/0061301 A1 | 3/2010 | Antal et al. | |
| 2017/0064585 A1* | 3/2017 | Kim | H04W 36/0033 |
| 2017/0086118 A1* | 3/2017 | Vrzic | H04W 36/26 |
| 2017/0142591 A1* | 5/2017 | Vrzic | H04L 47/2408 |
| 2017/0164195 A1* | 6/2017 | Stammers | H04W 12/0808 |
| 2017/0164212 A1* | 6/2017 | Opsenica | H04W 24/02 |
| 2017/0188275 A1* | 6/2017 | Kim | H04W 8/082 |
| 2017/0359768 A1* | 12/2017 | Byun | H04W 8/06 |
| 2018/0176858 A1* | 6/2018 | Wang | H04W 76/12 |
| 2018/0352592 A1* | 12/2018 | Zhu | H04L 5/0053 |
| 2018/0359337 A1* | 12/2018 | Kodaypak | H04L 43/08 |
| 2019/0110231 A1* | 4/2019 | Youn | H04L 12/4633 |
| 2019/0141562 A1* | 5/2019 | Tyagi | H04W 28/0215 |
| 2019/0230584 A1* | 7/2019 | Lou | H04W 48/18 |
| 2019/0239156 A1* | 8/2019 | Wang | H04W 76/12 |
| 2019/0261164 A1 | 8/2019 | Cai | |
| 2019/0261187 A1* | 8/2019 | Chen | H04W 76/20 |
| 2019/0349774 A1* | 11/2019 | Lou | H04W 16/10 |
| 2019/0349838 A1* | 11/2019 | Futaki | H04W 88/08 |
| 2019/0357103 A1* | 11/2019 | Jin | H04W 36/14 |
| 2020/0059842 A1* | 2/2020 | Vrzic | H04W 36/26 |
| 2020/0177687 A1* | 6/2020 | Kodaypak | H04L 67/18 |
| 2020/0178323 A1* | 6/2020 | Zhu | H04W 36/00 |
| 2020/0275360 A1* | 8/2020 | Bordeleau | H04L 41/0816 |
| 2020/0374946 A1* | 11/2020 | Bedekar | H04W 92/04 |

FOREIGN PATENT DOCUMENTS

| | | | | |
|---|---|---|---|---|
| AU | 2018233216 A1* | 10/2019 | | H04W 60/04 |
| AU | 2018233216 B2* | 6/2020 | | H04W 48/18 |
| BR | 112019019050 A2* | 4/2020 | | H04W 36/0011 |
| CN | 101090559 A | 12/2007 | | |
| CN | 101573997 A | 11/2009 | | |
| CN | 105828315 A | 8/2016 | | |
| CN | 106912012 A | 6/2017 | | |
| CN | 106912117 A | 6/2017 | | |
| CN | 107343306 A* | 11/2017 | | H04W 48/08 |
| CN | 107484224 A | 12/2017 | | |
| CN | 107852608 A* | 3/2018 | | H04W 8/20 |
| CN | 108307402 A | 7/2018 | | |
| CN | 108632808 A* | 10/2018 | | H04W 8/20 |
| CN | 109155960 A* | 1/2019 | | H04L 41/0893 |
| CN | 107343306 B* | 3/2019 | | H04W 48/08 |
| CN | 110036675 A* | 7/2019 | | B61L 25/02 |
| EP | 3286946 A1* | 2/2018 | | H04W 48/12 |
| EP | 3286946 A4* | 7/2018 | | H04W 8/20 |
| EP | 3402253 A1* | 11/2018 | | H04W 8/26 |
| EP | 3449667 A1* | 3/2019 | | H04W 48/18 |
| EP | 3402253 A4* | 5/2019 | | H04L 5/0053 |
| EP | 3449667 A4* | 10/2019 | | H04W 8/005 |
| EP | 3552444 A1* | 10/2019 | | H04W 4/029 |
| EP | 3286946 B1* | 2/2020 | | H04W 8/20 |
| EP | 3697022 A1* | 8/2020 | | H04W 36/0077 |
| JP | 6479989 B2* | 3/2019 | | H04W 76/11 |
| KR | 20180019061 A* | 2/2018 | | H04W 76/11 |
| KR | 101871355 B1* | 6/2018 | | H04W 48/18 |
| KR | 20180072854 A* | 6/2018 | | H04W 48/12 |
| KR | 20190002584 A* | 1/2019 | | H04L 41/0893 |
| KR | 101981909 B1* | 5/2019 | | H04W 76/12 |
| KR | 20190057154 A* | 5/2019 | | H04W 48/16 |
| KR | 20190121823 A* | 10/2019 | | H04W 48/16 |
| KR | 102050201 B1* | 11/2019 | | H04W 48/16 |
| WO | 2007139626 A2 | 12/2007 | | |
| WO | WO-2007139626 A3* | 2/2008 | | H04W 64/00 |
| WO | 2008082352 A1 | 7/2008 | | |
| WO | WO-2017186092 A1* | 11/2017 | | H04W 48/08 |
| WO | WO-2017187358 A1* | 11/2017 | | H04L 41/0893 |
| WO | WO-2018006221 A* | 1/2018 | | H04W 48/18 |
| WO | 2018041000 A1 | 3/2018 | | |
| WO | WO-2018104812 A1* | 6/2018 | | H04W 4/029 |
| WO | WO-2018166306 A1* | 9/2018 | | H04W 8/20 |

OTHER PUBLICATIONS

Ericsson, Supporting UE connected to multiple NW slices through separate UPs (Group C in Annex D), Aug. 29, 2016, 3GPP, SA WG2 Meeting #116bis, Tdoc: S2-164401 (Year: 2016).*
LG Electronics Inc., Solution on Network Slice Instance Reselection, Aug. 29, 2016, 3GPP, SA WG2 Meeting #116BIS, Tdoc: S2-164458 (Year: 2016).*
Motorola Mobility et al., Solution: Multiple Independent Slices per UE, Aug. 29, 2016, 3GPP, SA WG2 Meeting #116bis, Tdoc: S2-164499 (Year: 2016).*
Huawei et al., Network Slice selection in roaming scenario, Aug. 29, 2016, 3GPP, SA WG2 Meeting #116BIS, Tdoc: S2-164512 (Year: 2016).*
Ericsson, Updates to Solution 1.5: Selection of a network slice instance, Aug. 29, 2016, 3GPP, SA WG2 Meeting #116bis, Tdoc: S2-164527 (Year: 2016).*
Samsung, Selection mechanism for UP function, Aug. 29, 2016, 3GPP, SA WG2 Meeting #116BIS, Tdoc: S2-164541 (Year: 2016).*
Ericsson, Updates to Solution 1.5: Selection of a network slice instance, Aug. 19, 2016, SA WG2 Meeting #116bis, Tdoc: S2-165124 (Year: 2016).*
Samsung, Mobility restriction area per network slice, Jan. 16, 2017, 3GPP, SA WG2 Meeting #118-BIS, Tdoc: S2-170262 (Year: 2017).*
Samsung et al., UE triggered network slice change, Feb. 13, 2017, 3GPP, SA WG2 Meeting #119, Tdoc: S2-171089 (Year: 2017).*
3GPP TR 23.799 V14.0.0 (Dec. 2016),3rd Generation Partnership Project;Technical Specification Group Services and System Aspects;Study on Architecture for Next Generation System(Release 14),total 522 pages.
XP051295181 3GPP TR 23.714 V14.0.0 (Jun. 2016), 3rd Generation Partnership Project;Technical Specification Group Services and System Aspects;Study on control and user plane separation of EPC nodes(Release 14), Jun. 2016. total 87 pages.
S2-153999 Huawei, HiSilicon,"Solution to key issue 2—UPE selection at CPE",SA WG2 Meeting #112, Nov. 16-20, 2015, Anaheim, US. total 2 pages.

* cited by examiner

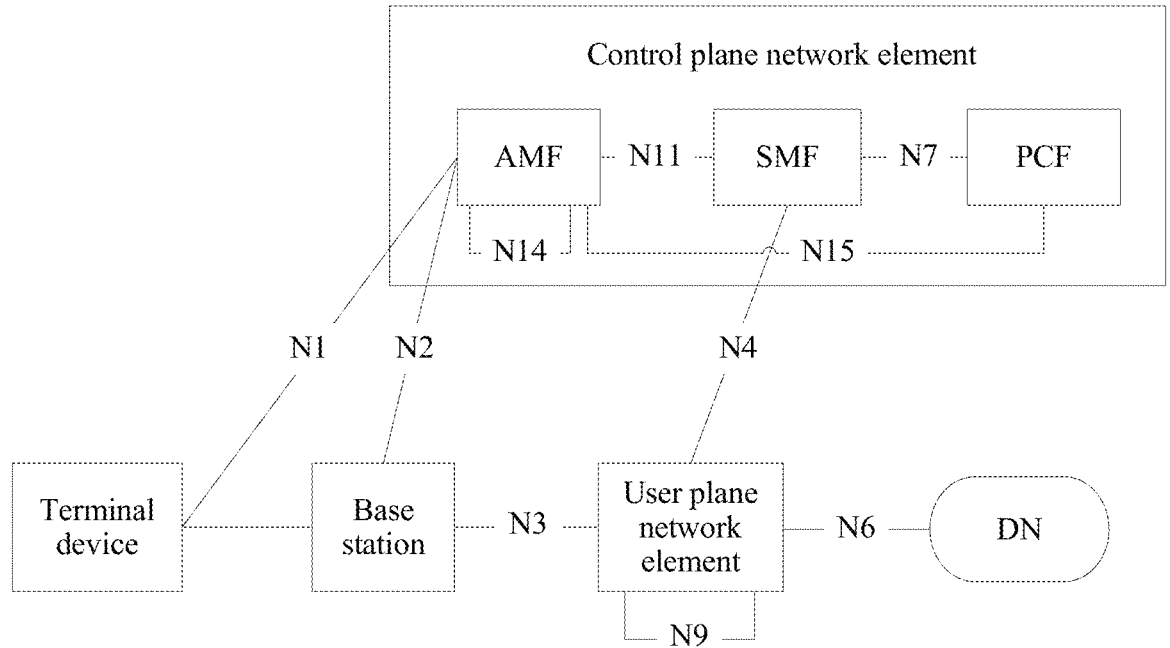

A control plane network element in a core network determines a first user plane network element set from a plurality of preset user plane network element sets in the core network based on a service requested by a terminal device

S202

The control plane network element selects, from the first user plane network element set, a first target user plane network element that supports the service

S203

The control plane network element establishes a session connection of the terminal device based on the first target user plane network element

FIG. 2

SESSION CONNECTION ESTABLISHMENT METHOD AND CONTROL PLANE NETWORK ELEMENT

CROSS-REFERENCE TO RELATED APPLICATIONS

This application is a continuation of International Application No. PCT/CN2018/081488, filed on Mar. 31, 2018, which claims priority to Chinese Patent Application No. 201710214336.1, filed on Apr. 1, 2017. The disclosures of the aforementioned applications are herein incorporated by reference in their entireties.

TECHNICAL FIELD

Embodiments of the application relate to the field of communications technologies, and in particular, to a session connection establishment method and a control plane network element.

BACKGROUND

A mobile communications network includes two parts: an access network and a core network. The access network is an edge part of the mobile communications network, and is responsible for connecting terminal devices to the core network. The core network (that is, an evolved packet core (EPC)) is responsible for connecting the terminal devices to different networks, and is responsible for functions such as charging and mobility management.

Core network devices in a conventional EPC include a mobility management entity (MME), a gateway device, and the like. The gateway device includes a serving gateway (S-GW) and a packet data network gateway (P-GW). The gateway device is responsible for user plane data forwarding and some control functions. Therefore, before performing a communication service, the terminal device needs to establish a user plane transmission channel (that is, a session connection) with the gateway device in the core network.

Because the gateway device is an anchor for maintaining service continuity, in a conventional core network, the gateway device is in a relatively high network location, that is, the gateway device is far from a base station in an access network. With continuous evolution of the core network, to reduce an end-to-end service latency of the terminal device, some gateway devices in the core network are gradually deployed in edge network locations, that is, these gateway devices are at different distances to the base station. Therefore, deployment of the gateway devices is accordingly changed from original centralized deployment to relatively distributed deployment.

In addition, for effective reduction of costs pressure brought by distributed deployment, and for improved elasticity, flexibility, and service diversification of an architecture of the core network, the core network separates logical functions of a gateway device into a control plane (CP) and a user plane (UP). In this way, the gateway device in the core network is replaced with a control plane network element and a user plane network element.

Apparently, the user plane is separated from the control plane, and the gateway device is deployed in an edge network location. This is an evolution trend of the core network. However, in an evolved core network, how to select a proper user plane network element from a plurality of distributed user plane network elements for a service-requesting terminal device to establish a session connection is an urgent problem to be resolved in the art.

SUMMARY

Embodiments of the application provide a session connection establishment method and a control plane network element, to select a proper user plane network element from a plurality of distributed user plane network elements for a terminal device that requests a service.

According to a first aspect, this application provides a session connection establishment method. The method may be applied to a mobile communications network shown in FIG. 1. The communications network includes a core network. The core network includes a control plane network element and a plurality of distributed user plane network elements, and the plurality of user plane network elements are divided into a plurality of user plane network elements sets in advance. The method includes the following steps.

The control plane network element determines, from the plurality of user plane network element sets based on a service requested by a terminal device, a first user plane network element set including a plurality of first user plane network elements; selects, from the first user plane network element set, a first target user plane network element that supports the service; and establishes a session connection of the terminal device based on the first target user plane network element.

By using the foregoing method, the control plane network element may determine the first user plane network element set from the plurality of distributed user plane network elements based on the service, to quickly select, from the first user plane network element set, the first target user plane network element that supports the service, and establish a session connection of the terminal device. Apparently, according to the method, a proper user plane network element can be selected from the plurality of distributed user plane network elements for a terminal device that requests a service, thereby improving working efficiency when the control plane network element establishes a session connection of the terminal device.

In one embodiment, the control plane network element in the core network may divide the plurality of distributed user plane network elements into different user plane network elements sets according to a set principle based on service information (a QoS parameter (such as a latency), a type of a supported service, and a specified area in which a user plane network element that supports a different type of service is located) used by the user plane network elements to implement various services.

In one embodiment, the control plane network element in the core network divides the user plane network element sets according to distances between the user plane network elements and a connected base station in an access network.

In one embodiment, the control plane network element in the core network determines several reference points: a base station, an aggregation layer network device, a core layer network device, and the like based on distances from the base station in the access network, and divides a user plane network element set based on distances between the user plane network elements and each reference point.

According to the foregoing three methods in the designs, the plurality of distributed user plane network elements in the core network can be divided into the plurality of user plane network element sets. The control plane network element in the core network can quickly select, from the plurality of user plane network elements based on the service requested by the terminal device, a user plane network element set in which a target user plane network element is located, thereby improving efficiency of selecting, by the control plane network element, a proper user plane network element for the terminal device that requests the service.

In one embodiment, after the control plane network element in the core network divides the plurality of user plane network elements in the core network into the plurality of user plane network elements sets according to a manner in the foregoing design, the control plane network element in the core network may establish a correspondence between a service and a user plane network element set by using service features of various services (a QoS requirement (represented by using a QoS parameter), a service type, a preset area that supports various services, and the like).

According to the foregoing method, the control plane network element in the core network can quickly and accurately select the user plane network element set corresponding to the service from the plurality of user plane network element sets based on the service requested by the terminal device, so that a proper user plane network element can be selected from the selected user plane network element set, thereby improving efficiency of selecting, by the control plane network element, a proper user plane network element for the terminal device that requests the service.

In one embodiment, the control plane network element may determine the first user plane network element set from the plurality of user plane network element sets based on the service in the following manners.

Manner 1: The control plane network element determines the first user plane network element set corresponding to the service from the plurality of user plane network element sets based on a correspondence between a preset service and a user plane network element set.

Manner 2: The control plane network element determines a plurality of to-be-selected user plane network element sets corresponding to the service from the plurality of user plane network element sets based on a correspondence between a preset service and a user plane network element set; and obtains subscription data of the terminal device, and selects the first user plane network element set from the plurality of to-be-selected user plane network element sets based on the subscription data.

Manner 3: The control plane network element notifies the service to another control plane network element, and obtains the first user plane network element set that is determined by the another control plane network element from the plurality of user plane network element sets based on the service, or obtains the first user plane network element set that is determined by the another control plane network element from the plurality of user plane network element sets based on the service and subscription data of the terminal device.

According to the foregoing method, the control plane network element in the core network can quickly and accurately select the user plane network element set corresponding to the service from the plurality of user plane network element sets based on the service requested by the terminal device.

In one embodiment, when the plurality of user plane network elements in the core network are divided based on distances between the user plane network elements and a base station in the mobile communications network, physical distances between the plurality of first user plane network elements and the base station in the mobile communications network fall within a specified first distance range.

In one embodiment, the control plane network element selects the first target user plane network element from the first user plane network element set by using the following method.

First, the control plane network element obtains a physical location of a first base station accessed by the terminal device and physical locations of the plurality of first user plane network elements; and then, the control plane network element determines, from the first user plane network element set, a plurality of to-be-selected first user plane network elements that support the service and whose physical locations are in a first service area in which the physical location of the first base station is located. Finally, the control plane network element selects, from the plurality of to-be-selected first user plane network elements, the first target user plane network element whose physical location is closest to the physical location of the first base station.

According to the foregoing method, it can be ensured that the first target user plane network element selected by the control plane network element can support the service, and a latency is minimum when the service is implemented by using the first target user plane network element, in other words, it can be ensured that the control plane network element selects a proper user plane network element for the terminal device that requests the service.

In one embodiment, after the control plane network element establishes the session connection of the terminal device based on the first target user plane network element, a base station accessed by the terminal device is switched from the first base station to the second base station because of a mobility characteristic of the terminal device. In this scenario, the method further includes the following steps:

determining, by the control plane network element, that the terminal device accesses a second base station, and obtaining a physical location of the second base station; and re-determining, by the control plane network element from the first user plane network element set, a plurality of to-be-selected first user plane network elements that support the service and whose physical locations are in a second service area, where the second service area is a specified area in which the physical location of the second base station is located; and re-selecting, from the plurality of re-determined to-be-selected first user plane network elements, a first target user plane network element whose physical location is closest to the physical location of the second base station; and establishing a session connection of the terminal device based on the re-selected first target user plane network element.

According to the foregoing method, in a process in which the terminal device has established a session connection and performs a service, when the base station is switched, the control plane network element may re-select a proper user plane network element for the terminal device, and re-establish a session connection, to ensure smooth implementation of the service by the terminal device.

In one embodiment, in a scenario in which after the control plane network element establishes the session connection of the terminal device based on the first target user plane network element, the subscription data of the terminal device is sent and changed, the method further includes the following steps:

First, the control plane network element determines a second user plane network element set in the following two manners. The second user plane network element set includes a plurality of second user plane network elements:

Manner 1: The control plane network element determines that the subscription data of the terminal device is changed, and selects the second user plane network element set from the plurality of to-be-selected user plane network element sets based on the changed subscription data.

Manner 2: The control plane network element obtains the second user plane network element set that is determined by the another control plane network element based on the service and the changed subscription data of the terminal device.

Then, the control plane network element selects, from the second user plane network element set, a second target user plane network element that supports the service, and establishes a session connection of the terminal device based on the second target user plane network element.

According to the foregoing method, in a process in which the terminal device has established a session connection and executes a service, when the subscription data is changed, the control plane network element may re-select a proper user plane network element for the terminal device, and re-establish a session connection, to ensure smooth implementation of the service by the terminal device, and ensure that the service implemented by the terminal device meets a user requirement of the terminal device.

According to a second aspect, an embodiment of this application further provides a control plane network element, and the control plane network element has a function of implementing the control plane network element in the foregoing method embodiment. The function may be implemented by hardware, or may be implemented by hardware executing corresponding software. The hardware or software includes one or more modules corresponding to the foregoing function.

In one embodiment, a structure of the control plane network element includes a determining unit, a selection unit, and a processing unit, and the units may perform corresponding functions in the foregoing method embodiment. For details, refer to detailed descriptions in the method embodiment. Details are not described herein.

In one embodiment, a structure of the control plane network element includes a processor and a memory, where the processor is configured to support the processing device in performing a corresponding function in the foregoing method. The memory is coupled with the processor, and the memory stores a program instruction and data that are necessary for the processor.

According to a third aspect, an embodiment of this application further provides a computer readable storage medium, configured to store a computer software instruction used to perform a function of any one of the first aspect or the designs of the first aspect. The computer software instruction includes a program designed for performing the method in any one of the first aspect or the designs of the first aspect.

According to a fourth aspect, an embodiment of this application further provides a computer program product including an instruction. When the computer program product is run on a computer, the computer is enabled to perform the method in the first aspect.

According to the solution provided in the embodiments of this application, the control plane network element in the core network may determine, based on the service requested by the terminal device, the first user plane network element set including a plurality of first user plane network elements, and select, from the first user plane network element set, the first target user plane network element that supports the service. Finally, the control plane network element may establish the session connection of the terminal device based on the first target user plane network element. In this solution, the control plane network element may determine the first user plane network element set from the plurality of distributed user plane network elements based on the service, to quickly select, from the first user plane network element set, the first target user plane network element that supports the service, and establish the session connection of the terminal device. Apparently, according to this solution, a proper user plane network element can be selected from the plurality of distributed user plane network elements for a terminal device that requests a service, thereby improving working efficiency when the control plane network element establishes a session connection of the terminal device.

BRIEF DESCRIPTION OF DRAWINGS

FIG. 1 is a schematic diagram of a mobile communications network according to an embodiment of this application;

FIG. 2 is a flowchart of a session connection establishment method according to an embodiment of this application;

DESCRIPTION OF EMBODIMENTS

Figure 3:
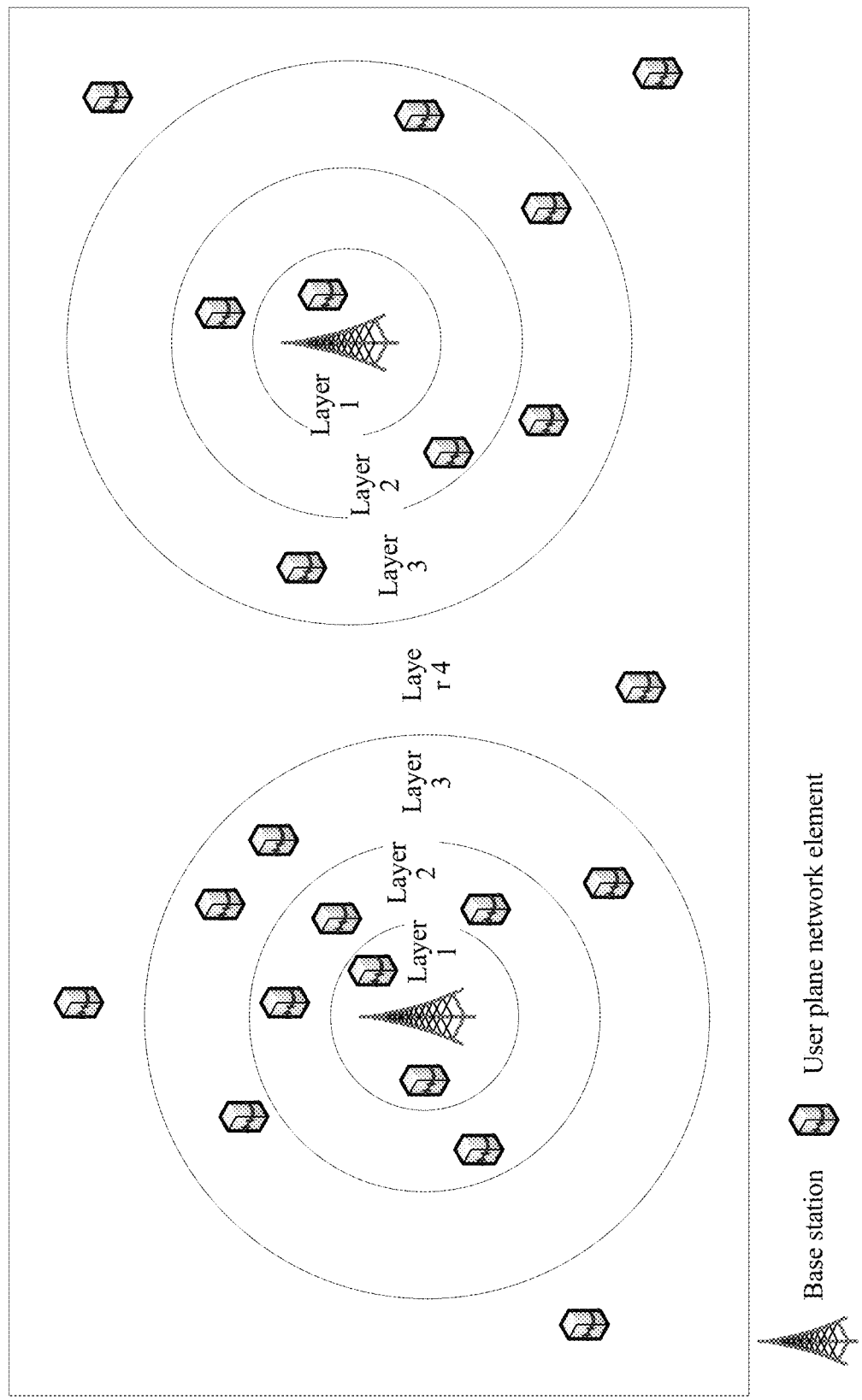
FIG. 3 is an example diagram of user plane network element set division according to an embodiment of this application.

To make the objectives, technical solutions, and advantages of this application clearer, the following further describes this application in detail with reference to the accompanying drawings.

This application provides a session connection establishment method and a control plane network element, to select a proper user plane network element from a plurality of distributed user plane network elements for a terminal device that requests a service. The method and the apparatus are based on a same invention concept. The method and the apparatus have similar problem-resolving principles. Therefore, for implementation of the apparatus and the method, reference may be made to each other, and details of repeated parts are not described.

According to the solution provided in the embodiments of this application, a control plane network element in a core network may determine, based on a service requested by a terminal device, a first user plane network element set including a plurality of first user plane network elements, and select, from the first user plane network element set, a first target user plane network element that supports the service. Finally, the control plane network element may establish a session connection of the terminal device based on the first target user plane network element. In this solution, the control plane network element may determine the first user plane network element set from a plurality of distributed user plane network elements based on the service, to quickly select, from the first user plane network element set, the first target user plane network element that supports the service, and establish the session connection of the terminal device. Apparently, according to this solution, a proper user plane network element can be selected from the plurality of distributed user plane network elements for a terminal device that requests a service, thereby improving working efficiency when the control plane network element establishes a session connection of the terminal device.

In the following, some terms in this application are described, to help a person skilled in the art have a better understanding.

1. A core network in this application is in a mobile communications network and is responsible for connecting, according to a call request or a service request sent by a terminal device by using an access network, the terminal device to a different data network, and is responsible for services such as charging, mobility management, and session management. The core network may be various core networks evolved from an EPC-based network architecture. In comparison with a conventional core network, in the core network in the embodiments of this application, logical functions of a user plane and a control plane are separated. Therefore, the core network includes two types of core network devices: a control plane network element and a user plane network element. In addition, the user plane network element in the core network is deployed in an edge network location, and consequently a plurality of user plane network elements in the core network are deployed at different distances to a base station in the access network, and the plurality of user plane network elements are relatively distributed.

2. A control plane network element in this application may also be referred to as a control plane function (CPF) entity, and is a core network element that has a control and management function and that is responsible for implementing session management, access and mobility management, policy control, and the like. The control plane network element may include an access and mobility management function (AMF) entity, a session management function (SMF) entity, a policy control function (PCF) entity, or another function entity formed by integrating any number of the network elements.

3. A user plane network element in this application may also be referred to as a user plane function (UPF) entity. It is an anchor for maintaining service continuity of the terminal device, and is responsible for forwarding user plane data of the terminal device.

4. A terminal device in this application is also referred to as user equipment (UE), and is a device that provides a user with voice and/or data connectivity, for example, a handheld device (such as a mobile phone or a tablet) having a wireless connection function, an in-vehicle device, a wearable device (such as a smart band, a smartwatch, or smart glasses), a computing device, a mobile station (Mobile Station, MS), another processing device connected to a wireless modem, or the like, and a mobile terminal that communicates with one or more core networks by using a radio access network.

5. A base station in this application provides a wireless access service for a terminal. The base station may be a NodeB (NB), an evolved NodeB (eNB), a radio network controller (RNC), a base station controller (BSC), a base transceiver station (BTS), a home base station (for example, a home eNB or a home Node B), a baseband unit (BBU), an access point (AP), a wireless interoperability for microwave access base station (WiMAX BS), or the like. This is not limited in this application.

6. A session connection in this application is a connection between a terminal device, a base station, a user plane network element, and a data network. The session connection is used to transmit data between the terminal device and the data network. In one embodiment, the session connection may be a packet data network (PDN) session connection or a packet data unit (PDU) session connection. This is not limited in this application.

7. A service requested by a terminal device in this application is requested when the terminal device expects to implement some functions or services. In one embodiment, in this application, services may be divided from different perspectives. For example, the services may be divided into a common service, a low-latency service, and a real-time service according to severity of latency requirements. The services may also be divided according to a function type or a service type, and the services may be divided into a data service, a voice service, a video service, and the like. In addition, regardless of a specific function or service that the terminal device expects to implement, the terminal device ultimately needs to implement the function or service by establishing a connection to a corresponding data network. In addition, during implementation of different functions or services, the terminal device needs to connect to different data networks. Therefore, the services may also be divided by using a data network that the terminal device requests to connect.

Based on the foregoing theory, in the embodiments of this application, a service manifestation form is not limited. The service may be manifested by using a latency requirement, a function type or a service type, or a data network number (DNN) in a terminal device request. In the embodiments of this application, that DNN is used to indicate the service is merely used as an example for description.

It should be noted that, "a plurality of" means "two or more" in this application.

In addition, it should be understood that, in the description of this application, terms "first" and "second" are only used for a purpose of distinguishing between descriptions, but cannot be understood as indication or implication of relative importance, and cannot be understood as an indication or implication of a sequence.

The embodiments of this application are described in detail below with reference to the accompanying drawings.

FIG. 1 shows an architecture of a possible mobile communications network to which a session connection establishment method according to an embodiment of this application is applicable. Referring to FIG. 1, the mobile communications network is divided into a radio access network and a core network.

The radio access network provides a radio access-related service for a terminal device. The radio access network includes a base station. Before implementing a service, the terminal device needs to access the base station, so that the base station provides a wireless access service for the terminal device.

The core network includes a control plane network element and a plurality of user plane network elements, and the plurality of user plane network elements are relatively distributed. The control plane network element is configured to implement functions such as session management, access and mobility management, and policy control. The user plane network element is configured to forward user plane data of the terminal device.

In a process in which the terminal device requests to establish a session connection or starts to request a specific service, the control plane network element selects a proper user plane network element from the plurality of user plane network elements for the terminal device based on a service requested by the terminal device, and establishes a session connection of the terminal device based on the selected user plane network element, so that data can be transmitted by using the session connection during service implementation of the terminal device. As shown in FIG. 1, the session connection of the terminal device is a connection between the terminal device, the base station, the user plane network element, and a data network (Data Network, DN).

The DN provides a business service for the terminal device through data transmission with the terminal device, and the DN may be a PDN network, such as an internet (Internet), an IP multi-media service (IMS) network, or an application-specific data network (such as a data network of TENCENT' Video).

In one embodiment, the control plane network element may be but is not limited to an AMF entity, an SMF entity, and a PCF entity, as shown in the figure.

The AMF entity is configured to be responsible for authentication, mobility management, and the like of the terminal device.

The SMF entity is configured to be responsible for session management, such as session creation, modification, and deletion, and user plane network element selection.

The PCF entity is configured to manage subscription data of the terminal device, and be responsible for functions such as policy control and decision making.

The terminal device, the base station, the DN, the user plane network element in the core network, and the control plane network element in the core network are connected by using corresponding interfaces, as shown in FIG. 1. Details are not described herein.

It should be noted that the embodiments of this application do not limit a distribution form of each function entity in the control plane network element. In one embodiment, the control plane network element may alternatively include another function entity that is formed by integrating any number of the network elements, for example, a function entity that has two functions: session management and policy control, or a function entity that has three functions: session management, access and mobility management, and policy control.

An embodiment of this application provides a session connection establishment method. The method is applicable to the mobile communications network shown in FIG. 1. The mobile communications network includes a core network, and the core network includes a control plane network element and a plurality of distributed user plane network elements. Referring to FIG. 2, a procedure of the method includes the following operations.

In operation 201, the control plane network element in the core network determines a first user plane network element set from a plurality of preset user plane network element sets in the core network based on a service requested by a terminal device, where the first user plane network element set includes a plurality of first user plane network elements.

Because the plurality of user plane network elements in the core network are relatively distributed, the control plane network element in the core network may divide the plurality of distributed user plane network elements into different user plane network element sets according to a specified principle based on service information used for implementing various services by the user plane network elements. Service information used for implementing various services by user plane network elements varies with a user plane network element set.

The service information may include but is not limited to at least one of the following: a quality of service (QoS) parameter (for example, a latency), a type of a supported service, a specified area in which a user plane network element that supports a different type of service is located (for example, a voice service or a video service can be supported in some specified area, and cannot be implemented in another area).

The following uses only an example in which the control plane network element of the core network may divide the plurality of user plane network elements into a plurality of user plane network elements sets based on different latencies generated when the user plane network elements implement various services. A key factor of a latency generated when a user plane network element implements a service lies in a distance between the user plane network element and a base station in an access network of the mobile communications network. Therefore, in the following several examples, the core network actually divides the user plane network element sets based on distances between the user plane network elements and the connected base station in the access network.

For example, as shown in FIG. 3, each ring in the figure corresponds to one layer, and distances between user plane network elements within the ring and a base station are similar. In the figure, the control plane network element may divide the user plane network elements into four user plane network element sets based on the distances to the base station.

A user plane network element within a first ring is one user plane network element set—layer (Layer) 1.

A user plane network element between the first ring and a second ring is another user plane network element set—layer 2.

A user plane network element between the second ring and a third ring is still another user plane network element set—layer 3.

A user plane network element outside a fourth ring is yet another user plane network element set—layer 4.

The first ring may be small enough to indicate that a user plane network element located in a same physical location as the base station belongs to the layer 1.

For another example, the control plane network element determines several reference points based on distances to the base station: a base station, an aggregation layer network device, a core layer network device, and the like. The control plane network element divides the user plane network element sets based on distances between the user plane network elements and each reference point.

A user plane network element distributed in a specified range near a base station (or located in a same physical location as the base station) is one user plane network element set—layer 1.

A user plane network element distributed in a specified range near an aggregation layer network device is another user plane network element set—layer 2.

A user plane network element distributed in a specified range near a core network device is still another user plane network element set—layer 3.

It should be noted that a reference point determined by the control plane network element based on a distance to the base station is not limited to the foregoing several devices, and each reference point may be selected based on an actual network hierarchy or a topology status of the mobile communications network.

In one embodiment, after the control plane network element in the core network divides the plurality of distributed user plane network elements into the plurality of user plane network elements sets in the foregoing manner, the control plane network element continues to establish a correspondence between a service and a user plane network element set based on service features of various services.

Corresponding to the service information used for implementing various services by the user plane network elements, the service features of the various services may include but are not limited to at least the following: a QoS requirement (represented by using a QoS parameter), a service type, and preset areas in which various services are supported.

A latency requirement of a service is still used as an example for description. If a service has a relatively high latency requirement, a user plane network element in a user plane network element set corresponding to the service generates a relatively low latency during service implementation. If a service has a relatively low latency requirement, a user plane network element in a user plane network element set corresponding to the service generates a relatively high latency during service implementation. In addition, if a subscribed user and a non-subscribed user are distinguished for a service or user levels are distinguished for a service so that different users correspond to different quality of service, the service may correspond to a plurality of user plane network element sets.

It can be learned from the foregoing description that some services may correspond to only one user plane network element set, while some services may correspond to a plurality of user plane network element sets. This is not limited in this application.

According to the foregoing method, the control plane network element in the core network divides a plurality of distributed user plane network elements into a plurality of user plane network element sets, and establishes the correspondence between a service and a user plane network element set. In this way, after determining a service requested by a terminal device, the control plane network element in the core network quickly and accurately determines a user plane network element set corresponding to the service, thereby improving efficiency of selecting a target user plane network element.

In one embodiment, when S201 is performed, the control plane network element may determine the first user plane network element set in any one of the following manners:

Manner 1: The control plane network element determines the first user plane network element set corresponding to the service from the plurality of user plane network element sets based on a correspondence between a preset service and a user plane network element set.

Manner 2: The control plane network element determines a plurality of to-be-selected user plane network element sets corresponding to the service from the plurality of user plane network element sets based on a correspondence between a preset service and a user plane network element set; and obtains subscription data of the terminal device, and selects the first user plane network element set from the plurality of to-be-selected user plane network element sets based on the subscription data. The subscription data includes a subscribed QoS level of the terminal device or a service priority (such as a gold-medal user or a bronze-medal user) of the terminal device, or the like, and the control plane network element may select, from the plurality of to-be-selected user plane network element sets based on the subscription data, the first user plane network element set that meets a requirement of the subscription data. For example, when the subscription data specifies that a user of the terminal device is a gold-medal user, the control plane network element needs to select a user plane network element set with a relatively high QoS level from the plurality of to-be-selected user plane network element sets, for example, select, from the plurality of to-be-selected user plane network element sets, a to-be-selected user plane network element set that includes a user plane network element closest to the base station.

Manner 3: The control plane network element notifies the service to another control plane network element, and obtains the first user plane network element set that is determined by the another control plane network element from the plurality of user plane network element sets based on the service, or obtains the first user plane network element set that is determined by the another control plane network element from the plurality of user plane network element sets based on the service and subscription data of the terminal device.

When the control plane network element (for example, an SMF entity, or a function entity integrating an SMF entity and a PCF entity) stores a correspondence between the service and a user plane network element set, the control plane network element may directly determine the first user plane network element set in the foregoing manner 1 or 2.

When the foregoing correspondence is not stored in the control plane network element (such as an SMF entity), but is stored in another control plane network element (such as a PCF entity) in the core network, the control plane network element may determine the first user plane network element set in the foregoing manner 3. In one embodiment, the method includes: The control plane network element sends the service (DNN) to the another control plane network element; the another control plane network element determines the first user plane network element set in the foregoing manner 1 or 2, and sends information about the first user plane network element set to the control plane network element; and the control plane network element determines the first user plane network element set based on the information about the first user plane network element set.

In one embodiment, when the plurality of user plane network element sets in the core network are divided based on the distances between the user plane network elements and the base station in the mobile communications network (as shown in FIG. 3), physical distances between the plurality of first user plane network elements included in the first user plane network element set and the base stations in the mobile communications network fall within a specified first distance range.

S202. The control plane network element selects, from the first user plane network element set, a first target user plane network element that supports the service.

In one embodiment, when the physical distances between the plurality of first user plane network elements included in the first user plane network element set and the base station in the mobile communications network fall within the specified first distance range, that the control plane network element selects, from the first user plane network element set, the first target user plane network element includes the following operations:

The control plane network element obtains a physical location of a first base station accessed by the terminal device and physical locations of the plurality of first user plane network elements.

The control plane network element determines, from the first user plane network element set, a plurality of to-be-selected first user plane network elements that support the service and whose physical locations are in a first service area, where the first service area is a specified area in which the physical location of the first base station is located.

The control plane network element selects, from the plurality of to-be-selected first user plane network elements, the first target user plane network element whose physical location is closest to the physical location of the first base station.

Because the physical distances between the plurality of first user plane network elements in the first user plane network element set and the base station in the mobile communications network fall within the specified first distance range, base stations in the mobile communications network are also relatively distributed. For example, physical locations of some base stations are in Beijing, and physical locations of some base stations are in Hebei. Therefore, to ensure a latency during service implementation of the terminal device, when selecting the first target user plane network element from the first user plane network element set, the control plane network element further needs to consider an area (that is, the first service area) in which the physical location of the first base station accessed by the terminal device is located. The first service area is set in correspondence to the first base station.

For example, an area in which the physical location of the first base station is located is Beijing. To ensure a latency during implementation of the service by the terminal device, the first target user plane network element selected by the control plane network element for the terminal device also needs to be in the physical location.

In one embodiment, after selecting the plurality of to-be-selected first user plane network elements by using the foregoing method, the control plane network element may further select the first target user plane network element from the plurality of to-be-selected first user plane network elements by using various load balancing methods.

In one embodiment, after selecting the plurality of to-be-selected first user plane network elements by using the foregoing method, the control plane network element may select, from the plurality of to-be-selected first user plane network elements, the first target user plane network element by combining a load balancing method and distances between the to-be-selected first user plane network elements and the first base station.

In one embodiment, in the foregoing method, the control plane network element may obtain the physical location of the first base station from another control plane network element (for example, an AMF entity), or the control plane network element (the control plane network element is a function entity integrating an AMF entity) may determine the physical location of the first base station when receiving a session request (Session Request) that is sent by the terminal device by using the first base station.

S203. The control plane network element establishes a session connection of the terminal device based on the first target user plane network element.

The control plane network element may establish the session connection of the terminal device by using a conventional session connection establishment procedure. The terminal device may connect to the data network by using the first target user plane network element.

By using the foregoing operations, the control plane network element establishes the session connection of the terminal device, to implement a connection of the terminal device to the data network, thereby ensuring that the terminal device can implement the requested service.

Because of a mobility feature of the terminal device, the terminal device may move after the session connection is established based on the first target user plane network element, and consequently a base station accessed by the terminal device is switched from the first base station to a second base station. Based on the foregoing scenario, optionally, after the control plane network element establishes the session connection of the terminal device based on the first target user plane network element, the method further includes:

determining, by the control plane network element, that the terminal device accesses a second base station, and obtaining a physical location of the second base station;

re-determining, by the control plane network element from the first user plane network element set, a plurality of to-be-selected first user plane network elements that support the service and whose physical locations are in a second service area, where the second service area is a specified area in which the physical location of the second base station is located;

re-selecting, by the control plane network element from the plurality of re-determined to-be-selected first user plane network elements, a first target user plane network element whose physical location is closest to the physical location of the second base station; and establishing, by the control plane network element, a session connection of the terminal device based on the re-selected first target user plane network element.

In the foregoing method, principles for selecting a target user plane network element by the control plane network element are the same. Therefore, for an operation of re-selecting the first target user plane network element and establishing the session connection by the control plane network element in this scenario, refer to the operation of selecting the first target user plane network element and establishing the session connection in the scenario in which the terminal device accesses the first base station. Details are not described herein.

According to the foregoing method, in a process in which the terminal device has established a session connection and performs a service, when the base station is switched, the control plane network element may re-select a proper user plane network element for the terminal device, and re-establish a session connection, to ensure smooth implementation of the service by the terminal device.

In addition, because the subscription data of the terminal device reflects a requirement of a user of the terminal device for the service, the subscription data of the terminal device may be changed at any time. When the subscription data of the terminal device is changed in a process in which the terminal device performs the service after the session connection is established based on the first target user plane network element, optionally, the control plane network element may re-establish a session connection for the terminal device. The subscription data of the terminal device affects a user plane network element selected by the control plane network element for the terminal device. To be specific, the control plane network element determines the user plane network element set in the manner 2 or 3 (and another control plane network element uses manner 2) when performing S201.

Based on the foregoing scenario, optionally, after the control plane network element establishes the session connection of the terminal device based on the first target user plane network element, the method further includes:

determining, by the control plane network element, that the subscription data of the terminal device is changed, and selecting a second user plane network element set from the plurality of to-be-selected user plane network element sets based on the changed subscription data; or obtaining, by the control plane network element, the second user plane network element set that is determined by the another control plane network element based on the service and the changed subscription data of the terminal device, where the second user plane network element set includes a plurality of second user plane network elements;

selecting, by the control plane network element from the second user plane network set, a second target user plane network element that supports the service; and establishing, by the control plane network element, a session connection of the terminal device based on the second target user plane network element.

In the foregoing method, principles for selecting a target user plane network element by the control plane network element are the same. Therefore, for an operation of re-selecting the second target user plane network element and establishing the session connection by the control plane network element in this scenario, refer to the operation of selecting the first target user plane network element and establishing the session connection by the terminal device. Details are not described herein.

According to the foregoing method, in a process in which the terminal device has established a session connection and executes a service, when the subscription data is changed, the control plane network element may re-select a proper user plane network element for the terminal device, and re-establish a session connection, to ensure smooth implementation of the service by the terminal device, and ensure that the service implemented by the terminal device meets a user requirement of the terminal device.

According to the method provided in this embodiment of this application, the control plane network element in the core network may determine, based on the service requested by the terminal device, the first user plane network element set including a plurality of first user plane network elements, and select, from the first user plane network element set, the first target user plane network element that supports the service. Finally, the control plane network element may establish the session connection of the terminal device based on the first target user plane network element. In this method, the control plane network element may determine the first user plane network element set from the plurality of distributed user plane network elements based on the service, to quickly select, from the first user plane network element set, the first target user plane network element that supports the service, and establish the session connection of the terminal device. Apparently, according to this method, a proper user plane network element can be selected from the plurality of distributed user plane network elements for a terminal device that requests a service, thereby improving working efficiency when the control plane network element establishes a session connection of the terminal device.

Based on the session connection establishment method provided in the foregoing embodiment, an embodiment of this application further provides an example of the session connection establishment method. The example is applied to the mobile communications network shown in FIG. 1. The mobile communications network includes an access network and a core network, and the core network includes a plurality of distributed user plane network elements and a plurality of control plane network elements that have different functions: an AMF entity, an SMF entity, and a PCF entity. The plurality of user plane network elements are divided into a plurality of user plane network element sets based on distances between the user plane network elements and a base station. The PCF entity stores a correspondence between a service and a user plane network element set, and stores subscription data of the terminal device.

Figure 4A:
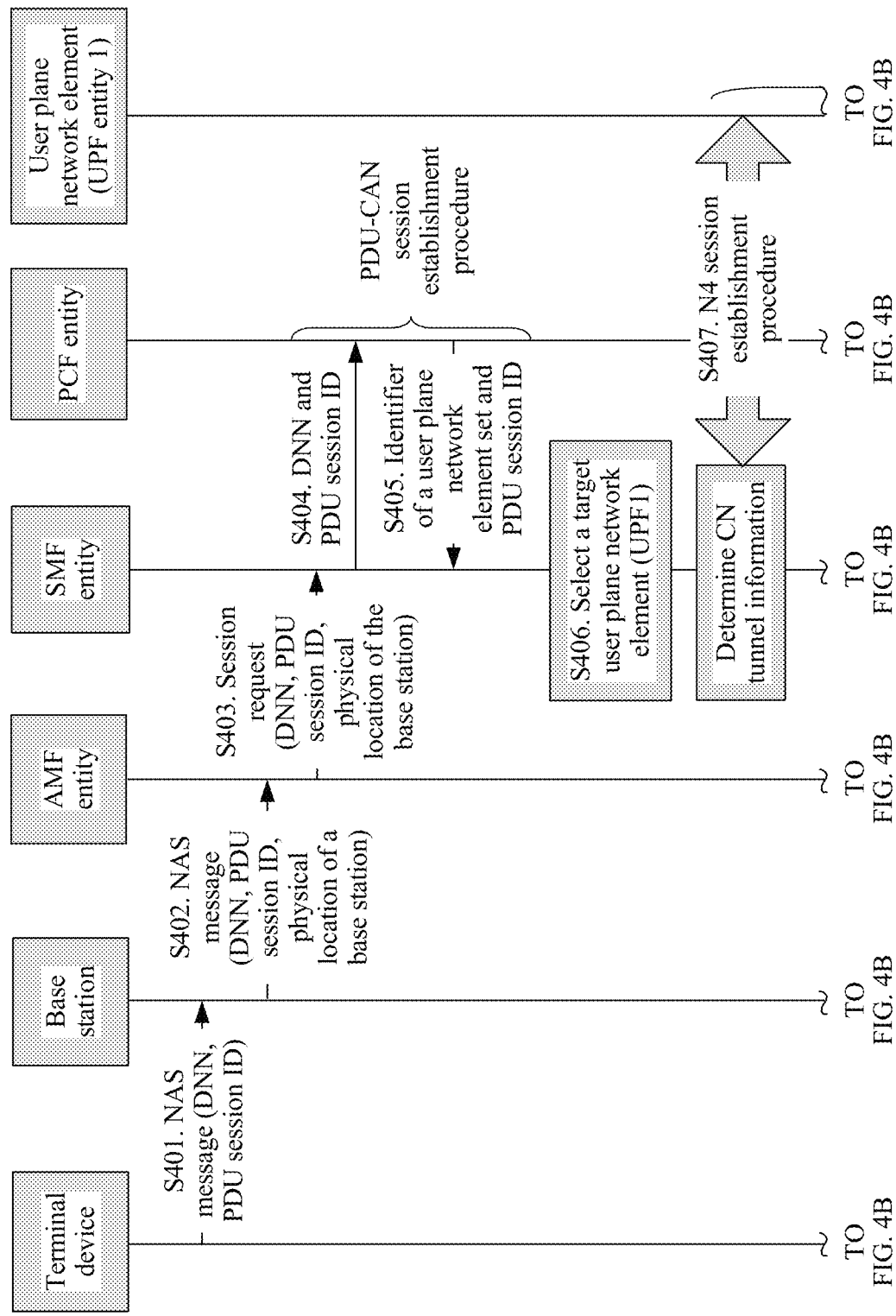
FIG. 4A and FIG. 4B are an example flowchart of a session connection establishment method according to an embodiment of this application.
Figure 4B:
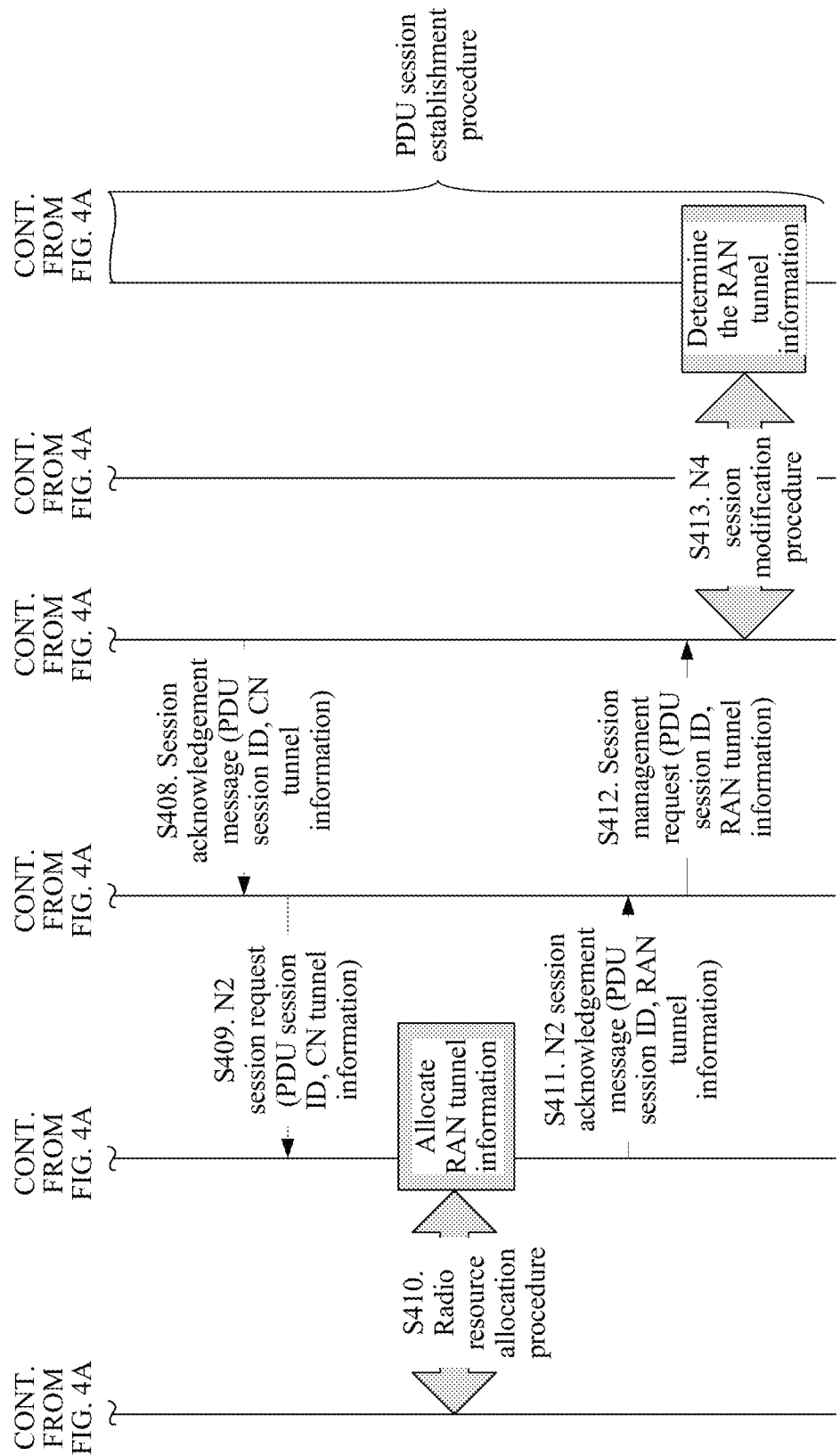

Based on the foregoing scenario, referring to FIG. 4A and FIG. 4B, a procedure of the session connection establishment method includes the following operations.

S401. When requesting to establish a session connection or starting to request a specific service, the terminal device determines a service (DNN) expected to be implemented or requested, generates an identifier of a PDU session connection that needs to be established: a PDU session identifier (PDU session identification, ID), includes the DNN and the PDU session ID in a non-access stratum (NAS) message, and sends the NAS message to a base station accessed by the terminal device.

It should be noted that the PDU session ID is used to indicate a PDU session connection. Therefore, in a subsequent process of selecting a target user plane network element and establishing a session connection, each message carries the PDU session ID, to identify that the message is transmitted for establishing the PDU session connection.

S402. After receiving the NAS message, the base station obtains the DNN and the PDU session ID, and continues to include the two pieces of obtained content together with a physical location of the base station in a NAS message, and sends the NAS message to the AMF entity in the core network.

S403. After receiving the NAS message sent by the base station, the AMF entity obtains the DNN, the PDU session ID, and the physical location of the base station that are included in the NAS message, includes the three pieces of content in a session request (Session Request), and sends the session request the SMF entity.

After S403, the SMF entity initiates a PDU-connectivity access network (CAN) session establishment procedure to the PCF entity after receiving the session request, and implements operation 404 and operation 405 in the session establishment procedure.

In operation 404, the SMF entity sends the DNN and the PDU session ID to the PCF entity.

In operation 405, the PCF entity determines, based on the DNN and the correspondence between a stored service (DNN) and a user plane network element set, a target user plane network element set corresponding to the DNN or a plurality of to-be-selected user plane network element sets corresponding to the DNN. When the PCF entity determines the plurality of to-be-selected user plane network element sets, the PCF entity obtains the stored subscription data of the terminal device, and selects the target user plane network element set from the plurality of to-be-selected user plane network element sets based on the subscription data. After determining the target user plane network element set, the PCF entity sends an identifier of the target user plane network element set and the PDU session ID to the SMF entity.

In operation 405, after receiving the identifier of the target user plane network element set, the SMF entity determines, from the user plane network element set based on the physical location of the base station and physical locations of a plurality of user plane network elements in the target user plane network element set, a plurality of to-be-selected user plane network elements that support the service (that can connect to a data network corresponding to the DNN) and whose physical locations are in a service area corresponding to the base station, and selects, from the plurality of to-be-selected user plane network elements, a target user plane network element whose physical location is closest to the physical location of the base station, that is, a UPF entity 1 in the figure.

In operation 407, the SMF entity initiates an N4 session establishment procedure to the UPF entity 1, and determines CN tunnel information during the N4 session establishment procedure.

The CN tunnel information corresponds to an uplink address of an N3 tunnel of the PDU session connection. Referring to FIG. 1, the N3 tunnel is a tunnel between the base station and the UPF entity 1. Therefore, after determining the CN tunnel information, the SMF entity needs to send the CN tunnel information to the base station by using subsequent operation 408 and operation 409.

In one embodiment, in the N4 session establishment procedure, the SMF entity may allocate core network (Core Network, CN) tunnel information to the PDU session connection, and send the CN tunnel information to the UPF entity 1.

In one embodiment, in the N4 session establishment procedure, after the SMF entity sends an N4 session request to the UPF entity 1, the UPF entity 1 allocates CN tunnel information to the PDU session connection, and sends the CN tunnel information to the UPF entity 1.

In the foregoing operation, the UPF entity 1 may determine the CN tunnel information required for establishing the PDU session connection.

S408. The SMF entity includes the CN tunnel information and the PDU session ID in a session acknowledgement message, and sends the session acknowledgement message to the AMF entity.

S409. After receiving the session acknowledgement message, the AMF entity includes the CN tunnel information and the PDU session ID in an N2 session request and sends the N2 session request to the base station.

S410. After receiving the N2 session request, the base station initiates a radio resource allocation procedure to allocate an air interface resource to the terminal device, and to allocate radio access network (RAN) tunnel information to the PDU session connection.

The RAN tunnel information corresponds to a downlink address of the N3 tunnel connected to the PDU session.

The base station sends the RAN tunnel information to the UPF entity 1 by using subsequent operations.

In operation 411, the base station includes the PDU session ID and the RAN tunnel information in an N2 session acknowledgement message, and sends the N2 session acknowledgement message to the AMF entity.

In operation 412, after receiving the N2 session acknowledgement message, the AMF entity includes the PDU session ID and the RAN tunnel information in a session management request and sends the session management request to the SMF entity.

In operation 413, the SMF initiates an N4 session modification procedure to the UPF entity 1, and sends the RAN tunnel information to the UPF entity 1 in the N4 session modification procedure, so that the UPF entity 1 may determine RAN tunnel information required for establishing the PDU session connection.

By using the foregoing operations, the base station obtains the CN tunnel information, and the UPF entity 1 obtains the RAN tunnel information. In this way, the base station and the UPF entity 1 can establish the PDU session connection based on the CN tunnel information and the RAN tunnel information.

Figure 5:
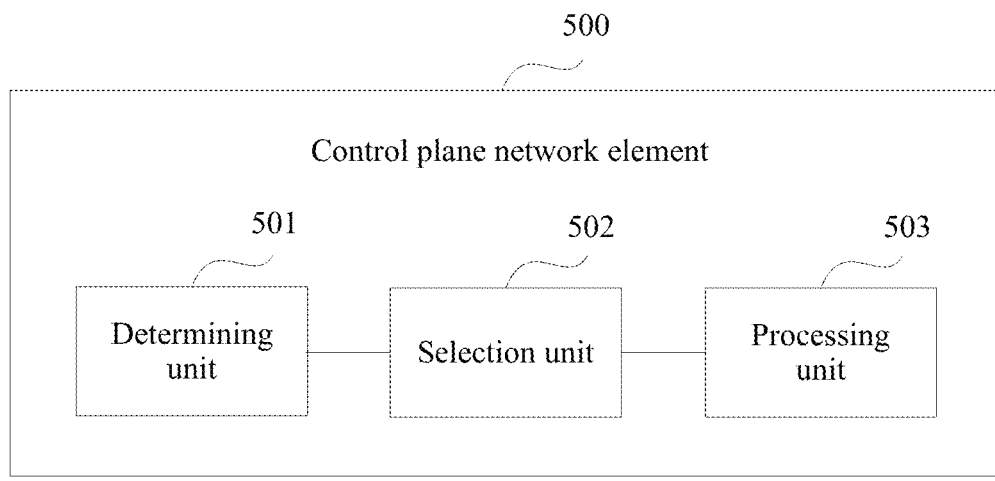
FIG. 5 is a structural diagram of a control plane network element according to an embodiment of this application.

Based on the foregoing embodiments, this application further provides a control plane network element. The control plane network element is configured to implement the session connection establishment method shown in FIG. 2, the control plane network element is applied to the mobile communications network shown in FIG. 1, and the control plane network element is located in the core network included in the mobile communications network. Referring to FIG. 5, the control plane network element 500 includes: a determining unit 501, a selection unit 502, and a processing unit 503.

The determining unit 501 is configured to determine a first user plane network element set from a plurality of preset user plane network element sets in the core network based on a service requested by a terminal device, where the first user plane network element set includes a plurality of first user plane network elements.

The selection unit 502 is configured to select, from the first user plane network element set, a first target user plane network element that supports the service.

The processing unit 503 is configured to establish a session connection of the terminal device based on the first target user plane network element.

In one embodiment, the determining unit 501 is specifically configured to:

determine the first user plane network element set corresponding to the service from the plurality of user plane network element sets based on a correspondence between a preset service and a user plane network element set; or determine a plurality of to-be-selected user plane network element sets corresponding to the service from the plurality of user plane network element sets based on a correspondence between a preset service and a user plane network element set; and obtain subscription data of the terminal device, and select the first user plane network element set from the plurality of to-be-selected user plane network element sets based on the subscription data; or notify the service to another control plane network element, and obtain the first user plane network element set that is determined by the another control plane network element from the plurality of user plane network element sets based on the service, or obtain the first user plane network element set that is determined by the another control plane network element from the plurality of user plane network element sets based on the service and subscription data of the terminal device.

In one embodiment, physical distances between the plurality of first user plane network elements and a base station in the mobile communications network fall within a specified first distance range.

In one embodiment, the selection unit 502 is specifically configured to:

obtain a physical location of a first base station accessed by the terminal device and physical locations of the plurality of first user plane network elements;

determine, from the first user plane network element set, a plurality of to-be-selected first user plane network elements that support the service and whose physical locations are in a first service area, where the first service area is a specified area in which the physical location of the first base station is located; and select, from the plurality of to-be-selected first user plane network elements, the first target user plane network element whose physical location is closest to the physical location of the first base station.

In one embodiment, after the processing unit 503 establishes the session connection of the terminal device based on the first target user plane network element, the selection unit 502 is further configured to:

determine that the terminal device accesses a second base station, and obtain a physical location of the second base station;

re-determine, from the first user plane network element set, a plurality of to-be-selected first user plane network elements that support the service and whose physical locations are in a second service area, where the second service area is a specified area in which the physical location of the second base station is located; and re-select, from the plurality of re-determined to-be-selected first user plane network elements, a first target user plane network element whose physical location is closest to the physical location of the second base station; and the processing unit 503 is further configured to establish a session connection of the terminal device based on the re-selected first target user plane network element.

In one embodiment, after the processing unit 503 establishes the session connection of the terminal device based on the first target user plane network element, the determining unit 501 is further configured to:

determine that the subscription data of the terminal device is changed, and select a second user plane network element set from the plurality of to-be-selected user plane network element sets based on the changed subscription data; or obtain the second user plane network element set that is determined by the another control plane network element based on the service and the changed subscription data of the terminal device, where the second user plane network element set includes a plurality of second user plane network elements;

the select unit 502 is configured to select, from the second user plane network element set, a second target user plane network element that supports the service; and the processing unit 503 is configured to establish a session connection of the terminal device based on the second target user plane network element.

According to the control plane network element provided in this embodiment of this application, the control plane network element may determine, based on the service requested by the terminal device, the first user plane network element set including a plurality of first user plane network elements, and select, from the first user plane network element set, the first target user plane network element that supports the service. Finally, the control plane network element may establish the session connection of the terminal device based on the first target user plane network element. In this solution, the control plane network element may determine the first user plane network element set from the plurality of distributed user plane network elements based on the service, to quickly select, from the first user plane network element set, the first target user plane network element that supports the service, and establish the session connection of the terminal device. Apparently, according to this solution, a proper user plane network element can be selected from the plurality of distributed user plane network elements for a terminal device that requests a service, thereby improving working efficiency when the control plane network element establishes a session connection of the terminal device.

It should be noted that in the embodiments of this application, division of modules is an example, and is merely a logical function division. In actual implementation, there may be another division manner. In addition, functional units in the embodiments of this application may be integrated into one processing unit, or may exist alone physically, or two or more than two units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some parts of the technical solutions may be implemented in the form of a software product. The computer software product is stored in a storage medium and includes several instructions for instructing a computer device (which may be a personal computer, a server, or a network device) or a processor (processor) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 6:
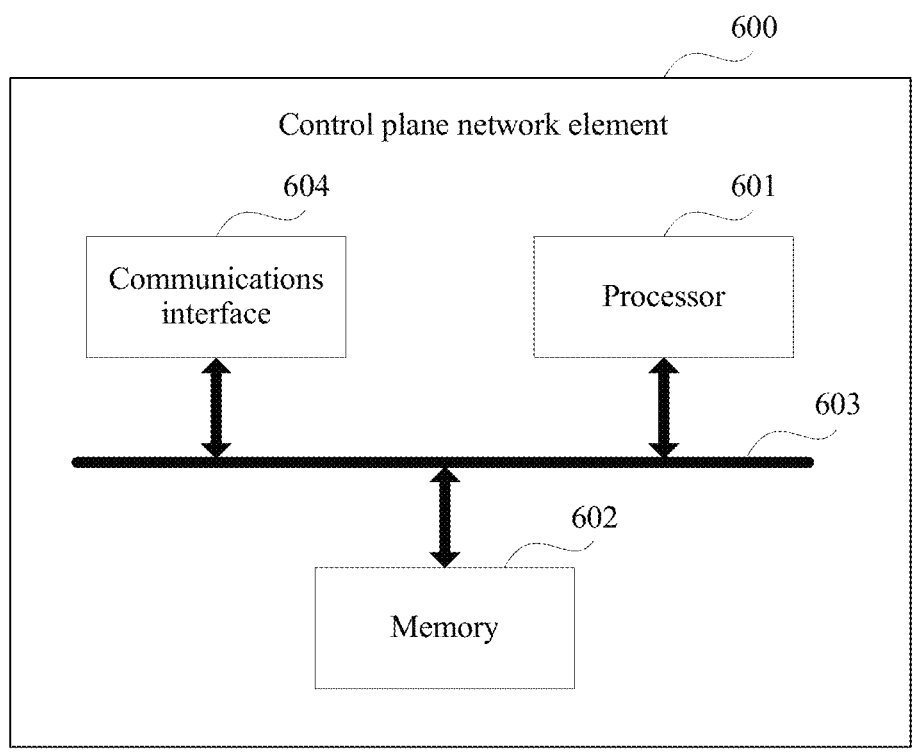
FIG. 6 is a structural diagram of another control plane network element according to an embodiment of this application.

Based on the foregoing embodiments, an embodiment of this application further provides a control plane network element. The control plane network element is configured to implement the session connection establishment method shown in FIG. 2, and has a function of the control plane network element 500 shown in FIG. 5. Referring to FIG. 6, the core network control plane network element includes a processor 601 and a memory 602.

The processor 601 and the memory 602 are connected to each other. In one embodiment, the processor 601 and the memory 602 are connected to each other by using a bus 603. The bus 603 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 6, but this does not mean that there is only one bus or only one type of bus.

In one embodiment, the control plane network element 600 further includes a communications interface 604, configured to communicate and interact with another device (a base station, a user plane network element, another control plane network element, or the like).

The processor 601 is configured to implement the session connection establishment method shown in FIG. 2, including:

determining a first user plane network element set from a plurality of preset user plane network element sets in the core network based on a service requested by a terminal device, where the first user plane network element set includes a plurality of first user plane network elements;

selecting, from the first user plane network element set, a first target user plane network element that supports the service; and establishing a session connection of the terminal device based on the first target user plane network element.

In one embodiment, when determining the first user plane network element set from the plurality of user plane network element sets based on the service, the processor 601 is specifically configured to:

determine the first user plane network element set corresponding to the service from the plurality of user plane network element sets based on a correspondence between a preset service and a user plane network element set; or determine a plurality of to-be-selected user plane network element sets corresponding to the service from the plurality of user plane network element sets based on a correspondence between a preset service and a user plane network element set; and obtain subscription data of the terminal device, and select the first user plane network element set from the plurality of to-be-selected user plane network element sets based on the subscription data; or notify the service to another control plane network element, and obtain the first user plane network element set that is determined by the another control plane network element from the plurality of user plane network element sets based on the service, or obtain the first user plane network element set that is determined by the another control plane network element from the plurality of user plane network element sets based on the service and subscription data of the terminal device.

In one embodiment, physical distances between the plurality of first user plane network elements and a base station in the mobile communications network fall within a specified first distance range.

In one embodiment, when selecting the first target user plane network element from the first user plane network element set, the processor 601 is specifically configured to:

obtain a physical location of a first base station accessed by the terminal device and physical locations of the plurality of first user plane network elements;

determine, from the first user plane network element set, a plurality of to-be-selected first user plane network elements that support the service and whose physical locations are in a first service area, where the first service area is a specified area in which the physical location of the first base station is located; and select, from the plurality of to-be-selected first user plane network elements, the first target user plane network element whose physical location is closest to the physical location of the first base station.

In one embodiment, after establishing the session connection of the terminal device based on the first target user plane network element, the processor 601 is further configured to:

determine that the terminal device accesses a second base station, and obtain a physical location of the second base station;

re-determine, from the first user plane network element set, a plurality of to-be-selected first user plane network elements that support the service and whose physical locations are in a second service area, where the second service area is a specified area in which the physical location of the second base station is located;

re-select, from the plurality of re-determined to-be-selected first user plane network elements, a first target user plane network element whose physical location is closest to the physical location of the second base station; and establish a session connection of the terminal device based on the re-selected first target user plane network element.

In one embodiment, after establishing the session connection of the terminal device based on the first target user plane network element, the processor 601 is further configured to:

determine that the subscription data of the terminal device is changed, and select a second user plane network element set from the plurality of to-be-selected user plane network element sets based on the changed subscription data; or obtain the second user plane network element set that is determined by the another control plane network element based on the service and the changed subscription data of the terminal device, where the second user plane network element set includes a plurality of second user plane network elements;

select, from the second user plane network element set, a second target user plane network element that supports the service; and establish a session connection of the terminal device based on the second target user plane network element.

The memory 602 is configured to store a program instruction and the like. Specifically, the program instruction may include program code, where the program code includes a computer operation instruction. The memory 602 may include a random access memory (RAM), or may further include a non-volatile memory (non-volatile memory), for example, at least one magnetic disk memory. The processor 601 performs a program stored in the memory 602 and implements the foregoing function, to implement the session connection establishment method shown in FIG. 2.

An embodiment of this application further provides a computer readable storage medium, configured to store a computer software instruction that needs to be performed by the processor 601 in the control plane network element shown in FIG. 6. The computer software instruction includes a program that needs to be executed by the foregoing processor 601.

According to the control plane network element provided in this embodiment of this application, the control plane network element may determine, based on the service requested by the terminal device, the first user plane network element set including a plurality of first user plane network elements, and select, from the first user plane network element set, the first target user plane network element that supports the service. Finally, the control plane network element may establish the session connection of the terminal device based on the first target user plane network element. In this solution, the control plane network element may determine the first user plane network element set from the plurality of distributed user plane network elements based on the service, to quickly select, from the first user plane network element set, the first target user plane network element that supports the service, and establish the session connection of the terminal device. Apparently, according to this solution, a proper user plane network element can be selected from the plurality of distributed user plane network elements for a terminal device that requests a service, thereby improving working efficiency when the control plane network element establishes a session connection of the terminal device.

In conclusion, the embodiments of this application provide the session connection establishment method and the control plane network element. In this solution, the control plane network element in the core network may determine, based on the service requested by the terminal device, the first user plane network element set including a plurality of first user plane network elements, and select, from the first user plane network element set, the first target user plane network element that supports the service. Finally, the control plane network element may establish the session connection of the terminal device based on the first target user plane network element. In this solution, the control plane network element may determine the first user plane network element set from the plurality of distributed user plane network elements based on the service, to quickly select, from the first user plane network element set, the first target user plane network element that supports the service, and establish the session connection of the terminal device. Apparently, according to this solution, a proper user plane network element can be selected from the plurality of distributed user plane network elements for a terminal device that requests a service, thereby improving working efficiency when the control plane network element establishes a session connection of the terminal device. A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Apparently, a person skilled in the art can make various modifications and variations to this application without departing in the spirit and scope of this application. This application is intended to cover these modifications and variations of this application provided that they fall within the scope of protection defined by the following claims and their equivalent technologies.

What is claimed is:

1. A session connection establishment method, comprising:
    determining, by a control plane network element in a core network of a mobile communications network, a first user plane network element set from a plurality of preset user plane network element sets of the core network based on a service requested by a terminal device, wherein the first user plane network element set comprises a plurality of first user plane network elements, wherein physical distances between the plurality of first user plane network elements and a base station in the mobile communications network fall within a specified first distance range;
    obtaining, by the control plane network element, a physical location of a first base station accessed by the terminal device and physical locations of the plurality of first user plane network elements;
    determining, by the control network plane element from the first user plane network element set, one or more first user plane network elements that support the service and that are located in a first service area in which the first base station is located;
    selecting, by the control network plane element from the one or more first user plane network elements, a first target user plane network element that is closest to the first base station; and
    establishing, by the control plane network element, a session connection of the terminal device based on the first target user plane network element.

2. The session connection establishment method according to claim 1, wherein the determining comprises:
    determining the first user plane network element set corresponding to the service from the plurality of preset user plane network element sets based on a correspondence between a preset service and a user plane network element set.

3. The session connection establishment method according to claim 1, wherein the determining comprises:
    determining a plurality of to-be-selected user plane network element sets corresponding to the service from the plurality of preset user plane network element sets based on a correspondence between a preset service and a user plane network element set; and
    obtaining subscription data of the terminal device, and selecting the first user plane network element set from the plurality of to-be-selected user plane network element sets based on the subscription data.

4. The session connection establishment method according to claim 1, wherein the determining comprises:
    notifying the service to another control plane network element, and obtaining the first user plane network element set that is determined by the another control plane network element from the plurality of preset user plane network element sets based on the service, or obtaining the first user plane network element set that is determined by the another control plane network element from the plurality of preset user plane network element sets based on the service and subscription data of the terminal device.

5. The session connection establishment method according to claim 1, wherein after the establishing of the session connection of the terminal device based on the first target user plane network element, the method further comprises:
    determining that the terminal device accesses a second base station, and obtaining a physical location of the second base station;
    determining, from the first user plane network element set, one or more second user plane network elements that support the service and that are located in a second service area, in which the second base station is located;
    selecting, from the one or more second user plane network elements, a second target user plane network element that is closest to the second base station; and
    establishing the session connection of the terminal device based on the second target user plane network element.

6. The session connection establishment method according to claim 1, wherein after the establishing of the session connection of the terminal device based on the first target user plane network element, the method further comprises:

determining that subscription data of the terminal device is changed, and selecting a second user plane network element set from a plurality of to-be-selected user plane network element sets based on the subscription data; or obtaining a second user plane network element set that is determined by another control plane network element based on the service and the subscription data of the terminal device, wherein the second user plane network element set comprises a plurality of second user plane network elements;

selecting, from the second user plane network set, a second target user plane network element that supports the service; and establishing the session connection of the terminal device based on the second target user plane network element.

7. A control plane network element of a core network in a mobile communications network, comprising:

at least one processor; and a computer readable medium in communication with the at least one processor and storing instructions which, when executed by the at least one processor, cause the control plane network element to:

determine a first user plane network element set from a plurality of preset user plane network element sets in the core network based on a service requested by a terminal device, wherein the first user plane network element set comprises a plurality of first user plane network elements, wherein physical distances between the plurality of first user plane network elements and a base station in the mobile communications network fall within a specified first distance range;

obtain a physical location of a first base station accessed by the terminal device and physical locations of the plurality of first user plane network elements;

determine, from the first user plane network element set, one or more first user plane network elements that support the service and that are located in a first service area in which the first base station is located;

select, from the one or more first user plane network elements, a first target user plane network element that is closest to the first base station; and establish a session connection of the terminal device based on the first target user plane network element.

8. The control plane network element according to claim 7, wherein the instructions, when executed by the at least one processor, further cause the control plane network element to:

determine the first user plane network element set corresponding to the service from the plurality of preset user plane network element sets based on a correspondence between a preset service and a user plane network element set.

9. The control plane network element according to claim 7, wherein the instructions, when further executed by the at least one processor, further cause the control plane network element to:

determine a plurality of to-be-selected user plane network element sets corresponding to the service from the plurality of preset user plane network element sets based on a correspondence between a preset service and a user plane network element set; and obtain subscription data of the terminal device; and select the first user plane network element set from the plurality of to-be-selected user plane network element sets based on the subscription data.

10. The control plane network element according to claim 7, wherein the instructions, when executed by the at least one processor, further cause the control plane network element to:

notify the service to another control plane network element, and obtain the first user plane network element set that is determined by the another control plane network element from the plurality of preset user plane network element sets based on the service, or obtain the first user plane network element set that is determined by the another control plane network element from the plurality of preset user plane network element sets based on the service and subscription data of the terminal device.

11. The control plane network element according to claim 7, wherein the instructions, when executed by the at least one processor, further cause the control plane network element to:

determine that the terminal device accesses a second base station, and obtain a physical location of the second base station;

determine, from the first user plane network element set one or more second user plane network elements that support the service and that are located in a second service area, in which the second base station is located; and select, from the one or more second user plane network elements, a second target user plane network element that is closest to the second base station; and establish the session connection of the terminal device based on the second target user plane network element.

12. A session connection establishment system, comprising:

a control plane network element of a core network in a mobile communications network; and a first target user plane network element;

wherein the control plane network element is configured to:

determine a first user plane network element set from a plurality of preset user plane network element sets in the core network based on a service requested by a terminal device, wherein the first user plane network element set comprises a plurality of first user plane network elements, wherein physical distances between the plurality of first user plane network elements and a base station in the mobile communications network fall within a specified first distance range;

obtain a physical location of a first base station accessed by the terminal device and physical locations of the plurality of first user plane network elements;

determine, from the first user plane network element set, one or more first user plane network elements that support the service and that are located in a first service area in which the first base station is located;

select, from the one or more first user plane network elements, the first target user plane network element that is closest to the first base station; and establish a session connection of the terminal device based on the first target user plane network element.

13. The session connection establishment system according to claim 12, wherein the control plane network element is configured to:

determine the first user plane network element set corresponding to the service from the plurality of preset user plane network element sets based on a correspondence between a preset service and a user plane network element set.

14. The session connection establishment system according to claim 12, wherein the control plane network element is configured to:
    determine a plurality of to-be-selected user plane network element sets corresponding to the service from the plurality of preset user plane network element sets based on a correspondence between a preset service and a user plane network element set; and
    obtain subscription data of the terminal device, and select the first user plane network element set from the plurality of to-be-selected user plane network element sets based on the subscription data.

15. The session connection establishment system according to claim 12, wherein the control plane network element is configured to:
    notify the service to another control plane network element, and obtain the first user plane network element set that is determined by the another control plane network element from the plurality of preset user plane network element sets based on the service, or obtain the first user plane network element set that is determined by the another control plane network element from the plurality of preset user plane network element sets based on the service and subscription data of the terminal device.

16. The session connection establishment system according to claim 12, wherein after the session connection of the terminal device is established based on the first target user plane network element, the control plane network element is further configured to:
    determine that the terminal device accesses a second base station, and obtain a physical location of the second base station;
    determine, from the first user plane network element set one or more second user plane network elements that support the service and that are located in a second service area, in which the second base station is located; and
    select, from the one or more second user plane network elements, a second target user plane network element that is closest to the second base station; and
    establish the session connection of the terminal device based on the second target user plane network element.

17. The session connection establishment system according to claim 12, wherein after the session connection of the terminal device is established based on the first target user plane network element, the control plane network element is further configured to:
    determine that subscription data of the terminal device is changed, and selecting a second user plane network element set from a plurality of to-be-selected user plane network element sets based on the subscription data; or obtaining a second user plane network element set that is determined by another control plane network element based on the service and the subscription data of the terminal device, wherein the second user plane network element set comprises a plurality of second user plane network elements;
    select, from the second user plane network set, a second target user plane network element that supports the service; and
    establish the session connection of the terminal device based on the second target user plane network element.

* * * * *